(12) United States Patent
Li et al.

(10) Patent No.: US 11,459,814 B2
(45) Date of Patent: Oct. 4, 2022

(54) VACUUM INSULATED GLASS PRODUCT

(71) Applicant: LUOYANG LANDGLASS TECHNOLOGY CO., LTD., Luoyang (CN)

(72) Inventors: Yanbing Li, Luoyang (CN); Zhangsheng Wang, Luoyang (CN)

(73) Assignee: Luoyang Landglass Technology Co., Ltd., Luoyang (CN)

( * ) Notice: Subject to any disclaimer, the term of this patent is extended or adjusted under 35 U.S.C. 154(b) by 548 days.

(21) Appl. No.: 16/607,178

(22) PCT Filed: Nov. 10, 2017

(86) PCT No.: PCT/CN2017/110309
§ 371 (c)(1),
(2) Date: Oct. 22, 2019

(87) PCT Pub. No.: WO2018/196334
PCT Pub. Date: Nov. 1, 2018

(65) Prior Publication Data
US 2020/0378177 A1    Dec. 3, 2020

(30) Foreign Application Priority Data

Apr. 26, 2017  (CN) .......................... 201710282659.4
Jul. 27, 2017  (CN) .......................... 201720920604.7

(51) Int. Cl.
*E06B 3/66* (2006.01)
*C03C 27/10* (2006.01)
(Continued)

(52) U.S. Cl.
CPC ............ *E06B 3/6612* (2013.01); *B23K 1/002* (2013.01); *B23K 1/0008* (2013.01); *B23K 1/19* (2013.01);
(Continued)

(58) Field of Classification Search
CPC ........ B23K 1/0008; B23K 1/002; B23K 1/19; B23K 2103/54; C03C 27/08; C03C 27/10;
(Continued)

(56) References Cited

FOREIGN PATENT DOCUMENTS

CN    102079632    *  6/2011
CN    102452801  A    5/2012
(Continued)

OTHER PUBLICATIONS

International Search Report dated May 2, 2018, issued in corresponding International Patent Application No. PCT/CN2017/110309.

*Primary Examiner* — Dana Ross
*Assistant Examiner* — Joseph W Iskra
(74) *Attorney, Agent, or Firm* — Morgan, Lewis & Bockius LLP

(57) ABSTRACT

A vacuum insulated glass product and the method for making the same, wherein the vacuum insulated glass comprises: a first glass substrate; a second glass substrate disposed facing the first glass substrate; a sealing structure provided between the first glass substrate and the second glass substrate and used for airtight binding of the first glass substrate and the second glass substrate to form a vacuum cavity; and a plurality of supports provided inside the vacuum cavity for bearing pressure from the first glass substrate and the second glass substrate. The sealing structure comprises: metal layers which are fixedly formed on facing surfaces of the first glass substrate and the second glass substrate, and an intermediate solder layer which is disposed between and connects the metal layers. The sealing structure has arc-shaped transition structures at the corner areas of the glass substrates.

13 Claims, 2 Drawing Sheets

(51) Int. Cl.
*B23K 1/00* (2006.01)
*B23K 1/002* (2006.01)
*B23K 1/19* (2006.01)
*E06B 3/663* (2006.01)
*B23K 103/00* (2006.01)
*C03C 27/08* (2006.01)
*E06B 3/673* (2006.01)

(52) U.S. Cl.
CPC .......... *C03C 27/10* (2013.01); *E06B 3/66357* (2013.01); *B23K 2103/54* (2018.08); *C03C 27/08* (2013.01); *E06B 3/67334* (2013.01); *E06B 2003/66338* (2013.01)

(58) Field of Classification Search
CPC ......... E06B 2003/66338; E06B 3/6612; E06B 3/66357; E06B 3/67334; Y02B 80/22; Y02A 30/249
USPC ........................................................ 65/32.1
See application file for complete search history.

(56) References Cited

FOREIGN PATENT DOCUMENTS

| | | | |
|---|---|---|---|
| CN | 105906222 | * | 8/2016 |
| CN | 105906222 A | | 8/2016 |

* cited by examiner

VACUUM INSULATED GLASS PRODUCT

CLAIM FOR PRIORITY

This application is a U.S. national phase entry under 35 U.S.C. § 371 from PCT International Application No. PCT/CN2017/110309 filed on Nov. 10, 2017, which is based upon and claims the benefit of priority from the prior Chinese Patent Application No. 201710282659.4 filed on Apr. 26, 2017 and Chinese Patent Application No. 201720920604.7 filed on Jul. 27, 2017. The entire contents of the above applications are incorporated herein by reference.

TECHNICAL FIELD

The present disclosure relates to the technical field of vacuum insulated glass, and in particular to a vacuum insulated glass product.

BACKGROUND

Vacuum insulated glass is an emerging category of glass, and is generally composed of two pieces of glass, between which is a vacuum layer. Due to the existence of this vacuum layer, vacuum insulated glass has good performance in sound insulation, heat insulation, and condensation resistance, and is more in line with the national development requirements for energy saving and environmental protection.

The sealing quality of vacuum insulated glass directly affects the performance of vacuum insulated glass. At present, the sealing of vacuum insulated glass mainly adopts two methods: one is sealing with low-melting-point glass powder, and the other is sealing with metal. Using metal for sealing may firstly prepare metal layers at the edge portions of the opposite surfaces of the two glass substrates, respectively, and then employ a brazing process to firmly connect the metal layers and the solder, thereby achieving airtight sealing of the two glass substrates.

In the sealing process, the brazing solder can be heated by high-frequency induction heating, and the high-frequency induction welding head is formed by a high-frequency induction coil. In the welding process, the centerline of the high-frequency induction welding head is aligned with the centerline of the welding strip, and the high-frequency induction welding head moves forward at a uniform speed along the centerline of the welding strip, thereby achieving airtight sealing around the vacuum insulated glass.

Since the solder and the metal layers coexist in the sealing area, in addition to heating the solder, the high-frequency induction welding head also heats the metal layers in the sealing area during the operation. Referring to FIG. 1, in the actual production process, a phenomenon of over-burning of the metal layer 3 often occurs in the corner areas 5 of the glass substrates, resulting in a dramatic reduction of the bonding strength between the metal layer 3 and the glass substrates. For example, when the metal layer is a silver film layer sintered on the glass substrate, silver in the silver film in the corner area of the glass substrate is fused into the brazing solder when overheating, causing a dramatic reduction of the welding strength in the corner area of the produced vacuum insulated glass, thereby affecting the welding reliability and the service life of the vacuum insulated glass.

SUMMARY OF THE DISCLOSURE

In view of the problem that the induction-heating welding in the prior art reduces the welding strength at the corners of the vacuum insulated glass, the inventors have found through research that: the high-frequency induction welding head necessarily conducts a deceleration-redirection-acceleration process when going through the corner areas. Therefore, the induction heating time of the internal corner portion in the corner areas of the vacuum insulated glass is too long, and the heating speed of the edges of the metal layers during the heating process is significantly greater than the heating speed of the center of the metal layers. These are the main causes for over-burning of the metal layers in the corner areas, especially the internal corner portion of the corner areas.

The inventors have also found through research that: changing the relative position of the moving trajectory of the center of the high-frequency induction welding head and the centerline of the metal layer in width direction, and making the moving trajectory of the center of the high-frequency induction welding head deviate from the centerline of the metal layers in width direction, may reduce the induction power of the metal layers in the corner areas, and thereby avoid the over-burning phenomenon of the metal layers in the corner areas.

A manner regarding changing the relative position of the moving trajectory of the center of the high-frequency induction welding head and the centerline of the metal layer in width direction may be changing the shape of the metal layers to make the inner and the outer edges of the metal layers in the corner areas in an arc-shape. By doing this, the high-frequency induction welding head travels along the centerline of the metal layers in width direction when going through the corner areas, thereby avoiding the over-burning problem of the metal layer in the corner areas. A vacuum insulated glass product can be obtained based on the above sealing method. The structure of the vacuum insulated glass product is as follows.

A vacuum insulated glass product comprises:
a first glass substrate;
a second glass substrate disposed opposite to the first glass substrate;
a sealing structure provided between the first glass substrate and the second glass substrate and adjacent to edges of the first glass substrate and the second glass substrate, configured to form a vacuum cavity by an airtight sealing of the first glass substrate and the second glass substrate; and
a plurality of supports provided inside the vacuum cavity for bearing pressure from the first glass substrate and the second glass substrate.

The sealing structure comprises: a metal layer which is fixedly formed on each of the two facing surfaces of the first glass substrate and the second glass substrate, respectively, and an intermediate solder layer which connects the two metal layers. The metal layers have arc-shaped transition structures at the corner areas of the glass substrates.

Further, the two metal layers and the intermediate solder layer are matched in width.

Further, the first glass substrate or the second glass substrate is provided with a pump-out hole.

Further, a gas adsorbent for absorbing residual gas is disposed in the vacuum cavity.

Further, the metal layers are sintered on the first glass substrate and the second glass substrate by a metal slurry, respectively.

Further, a width of a straight segment of the metal layer is d, an arc radius of an inner edge of the metal layer in the corner area is r, and an arc radius of an outer edge of the metal layer in the corner area is R, where $d=R-r$.

Further, the width of the straight segment of the metal layer is about 8 mm, the arc radius of the inner edge of the metal layer in the corner area is about 3 mm, and the arc radius of the outer edge of the metal layer in the corner area is about 11 mm.

This disclosure describes changing a shape of the sealing structure at the corner areas of the glass substrates, i.e., replacing break corners with arc-shaped transitions. By doing this, the time for repeatedly heating internal corner parts of a welding strip is reduced during induction welding, resulting in uniformly heating of the welding strip at the corner areas, and obtaining a glass product with better sealing effect.

In the figures: 1 denotes glass substrates, 2 denotes a support, 3 denotes metal layers, 4 denotes an arc-shaped transition structure, 5 denotes a corner area, 6 denotes a first glass substrate, 7 denotes a first metal layer, 8 denotes an intermediate solder layer, 9 denotes a second metal layer, 10 denotes a second glass substrate, 11 denotes a vacuum cavity, 12 denotes a sealing structure.

DETAILED DESCRIPTION

The mechanisms and features of the present disclosure are described in a more comprehensive manner through the accompanying drawings and exemplary embodiments. The present disclosure may be embodied in various forms, and should not be construed as being limited to the exemplary embodiments described herein.

For ease of description, spatially relative terms such as "above", "below", "left", and "right" may be used herein to describe a relationship between one element or feature shown in the figure and another element or feature. It should be understood that such spatially relative terms are intended to encompass different orientations and positions of the device during use or operation, in addition to the orientation and position depicted in the figures. For example, if the device in the figure is turned over, an element or feature described as being "below" another element or feature will then be "above" that element or feature. Therefore, the exemplary term "below" may encompass both positions of the above and below. The device may also be oriented in other ways (for example, rotated 90 degrees or at other positions or orientations), and the spatially relative terms used herein are to be interpreted accordingly.

Embodiment 1

Figure 1:
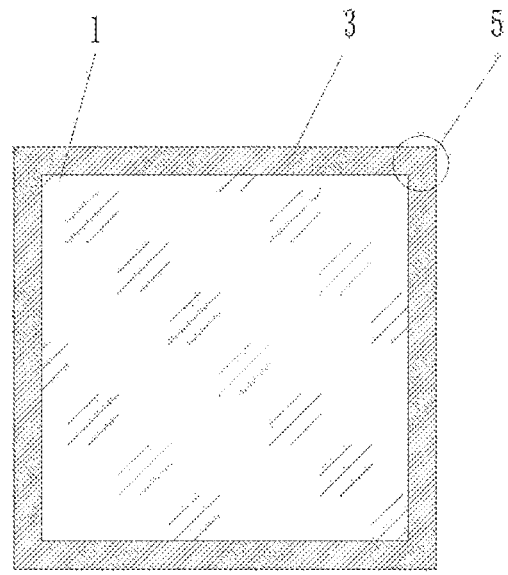
FIG. 1 is a schematic view of a welding strip of conventional vacuum insulated glass.
Figure 2:
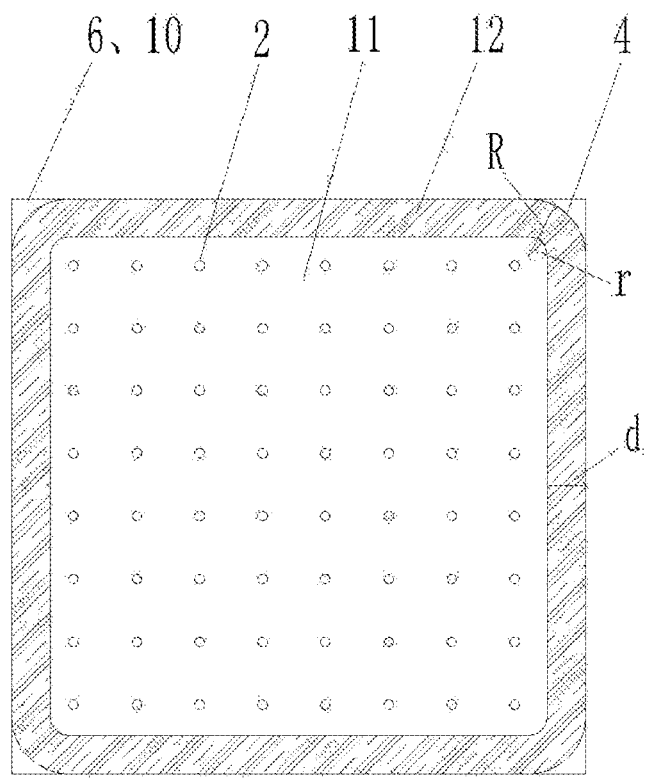
FIG. 2 is a structural schematic view of rectangular vacuum insulated glass according to the present disclosure.
Figure 3:
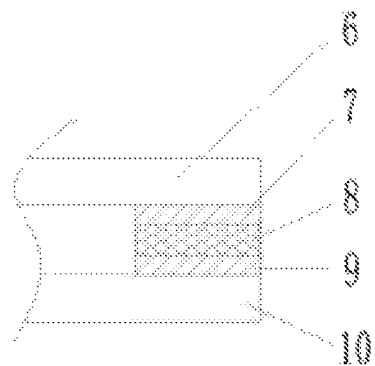
FIG. 3 is a structural view of the edge sealing structure of a vacuum insulated glass product according to the present disclosure.

As shown in FIG. 2 and FIG. 3, the vacuum insulated glass product of this embodiment comprises a first glass substrate 6 and a second glass substrate 10 each having a rectangular surface. The first glass substrate 6 or the second glass substrate 10 is placed on top of the other, and the first glass substrate 6 or the second glass substrate 10 is provided with a pump-out hole. A sealing structure is provided between the first glass substrate 6 and the second glass substrate 10. The sealing structure is disposed adjacent to edges of the first glass substrate 6 and the second glass substrate 10. The sealing structure 12 is used for airtight sealing of the first glass substrate 6 and the second glass substrate 10 to form a vacuum cavity 11. A gas adsorbent and a plurality of supports 2 are distributed and provided inside the vacuum cavity 11. The gas adsorbent is used for absorbing residual gas, and the supports 2 are used for bearing pressure from the first glass substrate 6 and the second glass substrate 10.

The sealing structure 12 specifically comprises a first metal layer 7, an intermediate solder layer 8, and a second metal layer 9. The first metal layer 7, the second metal layer 9, and the intermediate solder layer 8 are matched in width. The first metal layer 7 is fixed on a lower surface of the first glass substrate 6 through a metal slurry by a sintering process, the second metal layer 9 is fixed on an upper surface of the second glass substrate 9 through a metal slurry by a sintering process, and the intermediate solder layer 8 is welded to the first metal layer 7 and the second metal layer 9 by a high-frequency induction welding head. The sealing structure 12 has arc-shaped transition structures 4 at the corner areas of the glass substrates.

A width of a straight segment of the metal layer is d, an arc radius of an inner edge of the metal layer in the corner area is r, and an arc radius of an outer edge of the metal layer in the corner area is R, where $d=R-r$. For example, the width of the straight segment of the metal layer is about 8 mm, the arc radius of the inner edge of the metal layer in the corner area is about 3 mm, and the arc radius of the outer edge of the metal layer in the corner area is about 11 mm.

Embodiment 2

Figure 4:
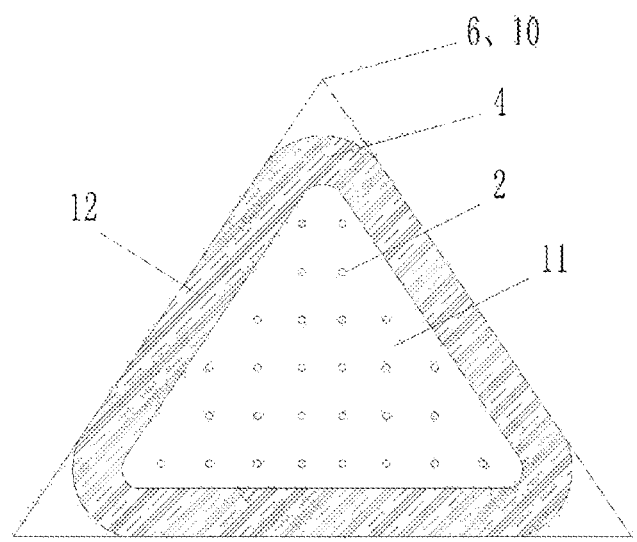
FIG. 4 is a structural schematic view of triangular vacuum insulated glass according to the present disclosure.

As shown in FIGS. 3 and 4, the structure of the vacuum insulated glass in this embodiment is substantially the same as that in Embodiment 1, except that the first glass substrate 6 and the second glass substrate 10 in this embodiment have triangular surfaces, and the final glass product is triangular vacuum insulated glass.

Although several exemplary embodiments of this application are described above with reference to the accompanying drawings, this application is not limited thereto. Any improvement and/or variation made by a person of ordinary skill in the art without departing from the spirit of this application shall fall within the protection scope of this application.

What is claimed is:

1. A vacuum insulated glass product, comprising:
   a first glass substrate;
   a second glass substrate, disposed facing the first glass substrate;
   a sealing structure, provided between the first glass substrate and the second glass substrate and adjacent to edges of the first glass substrate and the second glass substrate, and configured for airtight sealing of the first glass substrate and the second glass substrate to form a vacuum cavity; and
   a plurality of supports provided inside the vacuum cavity, and configured to bear pressures from the first glass substrate and the second glass substrate;
   wherein the sealing structure comprises:
      a metal layer which is fixedly formed on each of two facing surfaces of the first glass substrate and the second glass substrate, respectively, and an intermediate solder layer which connects the metal layers; and wherein the metal layers have arc-shaped transition structures at the corner areas of the glass substrates.

2. The vacuum insulated glass product according to claim 1, wherein the two metal layers and the intermediate solder layer are matched in width.

3. The vacuum insulated glass product according to claim 1, wherein the first glass substrate or the second glass substrate is provided with a pump-out hole.

4. The vacuum insulated glass product according to claim 1, wherein a gas adsorbent for absorbing residual gas is disposed in the vacuum cavity.

5. The vacuum insulated glass product according to claim 1, wherein the metal layer is sintered on the first glass substrate and the second glass substrate by a metal slurry, respectively.

6. The vacuum insulated glass product according to claim 1, a width of a straight segment of the metal layer is d, an arc radius of an inner edge of the metal layer in the corner area is r, and an arc radius of an outer edge of the metal layer in the corner area is R, wherein d=R−r.

7. The vacuum insulated glass product according to claim 1, wherein a width of a straight segment of the metal layer is about 8 mm, an arc radius of an inner edge of the metal layer in the corner area is about 3 mm, and an arc radius of an outer edge of the metal layer in the corner area is about 11 mm.

8. A method for making a vacuum insulated glass product, comprising:
    placing a first glass substrate or a second glass substrate on top of the other;
    fixedly forming a first metal layer and a second metal layer on facing surfaces of the first glass substrate and the second glass substrate, respectively, wherein the first metal layer and the second metal layer are disposed adjacent to edges of the first glass substrate and the second glass substrate and have arc-shaped transition structures at the corner areas of the first glass substrate and the second glass substrate;
    disposing an intermediate solder layer to connect the first metal layer and the second metal layer to form a sealing structure; and
    sealing the first glass substrate and the second glass substrate to form a vacuum cavity, wherein a plurality of supports are provided inside the vacuum cavity to bear pressures from the first glass substrate and the second glass substrate.

9. The method for making a vacuum insulated glass product according to claim 8, wherein the two metal layers and the intermediate solder layer are matched in width.

10. The method for making a vacuum insulated glass product according to claim 8, further comprising:
    providing a pump-out hole on the first glass substrate or the second glass substrate.

11. The method for making a vacuum insulated glass product according to claim 8, further comprising:
    disposing a gas adsorbent in the vacuum cavity to absorb residual gas.

12. The method for making a vacuum insulated glass product according to claim 8, wherein the first metal layer and the second metal layer are sintered on the first glass substrate and the second glass substrate by a metal slurry, respectively.

13. The method for making a vacuum insulated glass product according to claim 8,
    wherein a width of a straight segment of the first metal layer and the second metal layer is d, an arc radius of an inner edge of the first metal layer and the second metal layer in the corner area is r, and an arc radius of an outer edge of the first metal layer and the second metal layer in the corner area is R, wherein d=R−r.

* * * * *